US006053331A

United States Patent [19]

Cravello

[11] Patent Number: 6,053,331

[45] Date of Patent: *Apr. 25, 2000

[54] NON-TENSIONED SHAKER FILTER

[76] Inventor: William M. Cravello, 12535 E. 20th Pl., Tulsa, Okla. 74128

[ * ] Notice: This patent is subject to a terminal disclaimer.

[21] Appl. No.: 09/193,486

[22] Filed: Nov. 17, 1998

[51] Int. Cl.[7] .............................. B01D 33/03; B07B 1/49

[52] U.S. Cl. .......................... 210/388; 210/489; 210/490; 210/493.3; 210/499; 210/493.1; 209/401; 209/403

[58] Field of Search .................................... 210/388, 389, 210/493.1, 493.3, 489, 490, 499; 209/401, 403, 405

[56] References Cited

U.S. PATENT DOCUMENTS

| | | | |
|---|---|---|---|
| 4,126,560 | 11/1978 | Marcus et al. | 210/489 |
| 4,138,303 | 2/1979 | Taylor | 156/264 |
| 4,497,709 | 2/1985 | Nicholson | 210/489 |
| 4,696,751 | 9/1987 | Eifling | 210/780 |
| 5,076,924 | 12/1991 | Persson et al. | 210/474 |
| 5,330,057 | 7/1994 | Schiller et al. | 209/392 |
| 5,392,925 | 2/1995 | Seyffert | 209/405 |
| 5,417,793 | 5/1995 | Bakula . | |
| 5,417,858 | 5/1995 | Derrick et al. | 210/388 |
| 5,598,930 | 2/1997 | Leone et al. . | |
| 5,636,749 | 6/1997 | Wojciechowski . | |
| 5,690,826 | 11/1997 | Cravello | 210/384 |
| 5,783,077 | 7/1998 | Bakula . | |

FOREIGN PATENT DOCUMENTS

| | | |
|---|---|---|
| 599661 | 6/1960 | Canada . |

*Primary Examiner*—Thomas M. Lithgow
*Attorney, Agent, or Firm*—Molly D. McKay

[57] ABSTRACT

A new type of non-tensioned shaker filter for a shaker machine. The shaker filter is comprised of layers of wire cloth that are bonded together without a rigid backing and are corrugated. Left and right side edges are provided on the left and right sides of the filter, respectively, in order to protect the user from injury from sharp edges and to seal the filter to ledge provided on a non-tensioned means for securing the filter to the shaker. Front and back edges of the filter are provided with front and back lips respectively on a bottom side of the filter in order to protect the user from injury from sharp edges and to seal the filter to the non-tensioned means for securing the filter to the shaker.

3 Claims, 2 Drawing Sheets

NON-TENSIONED SHAKER FILTER

BACKGROUND OF THE INVENTION

1. Field of the Invention

The present invention relates to a new type of non-tensioned shaker filter for use in a shale shaker such as shakers designed to remove solids from drilling fluids. More specifically, the present invention is a new type of corrugated filter that does not employ a rigid backing material incorporated into the filter and that may be used with a shaker that is provided with non-tensioned means for securing a filter to a shaker. For example, one such non-tensioned means for securing a filter to a shaker is taught in U.S. Pat No. 5,690,826, a patent that was granted to the inventor of the present invention.

2. Description of the Related Art

In the drilling industry, shakers are used to remove large amounts of coarse, drilling cuttings from drilling fluids so that the drilling fluids may be reused or recirculated within the well that is being drilled. The cuttings are generally filtered out of the drilling fluid on a series of canted filters provided within the shaker. Dirty drilling fluid is introduced onto a top side of a front screen of a series of screens provided in the shaker. The drilling fluid flows through the filters and the cuttings, or tailings as they are sometimes called, remain on the topside of the filters. The drilling fluid that has passed through the filters is now clean of coarse debris and is ready to be cleaned via other processes prior to being ready for reuse. Due to the shaking action of the shaker, the tailings which were separated out of the drilling fluid are propelled rearwardly along the front canted filter until they reach the back edge of the first filter in the series and fall down to the adjacent front edge of the next filter in the series. The tailings move rearward along the next canted filter in the series as described for the front filter until finally, when the tailings reach the back edge of the last filter in the series, the tailings are relatively dry and they fall off the last filter into a tailings disposal portion of the shaker and are thus eliminated from the shaker.

Prior art shaker filters have, until now, always been under tension when they were in use. Prior art shaker filters were always one of the two common types of filters, i.e. either the hookstrip type filter or the rigid frame type filter. The rigid frame type filter is also known as the pretensioned type filter.

Hookstrip type filters have a rigid perforated backing, also sometimes referred to as an apertured plate or metal back, that is provided as an integral part of the filter in association with the filter medium. A rigid backing is necessary for the hookstrip type filters to function because these filters are secured between opposite walls of the shaker under a great deal of tension. This tension is placed on hookstrip type filters by means of clamps or drawbars that attach to and pull on the hook portion of the hookstrip type filter. A hook portion is provided on each of the two opposite side edges of the hookstrip type filter, and the drawbars that engage these hook portions are provided on the shaker. Tensioning bolts attach to the drawbars and secure the hookstrip type filters to the walls of the shaker.

The tensioning bolts are tightened in order to place the hookstrip type filters under tension, thereby pulling the hookstrip type filters tightly between the opposite walls of the shaker and forcing the hookstrip to be pulled downward over arched support components provided on the shaker. The arched support components extend between the opposite walls of the shaker and are secured to the walls of the shaker. The arched supports extend transverse to the longitudinal axis of the filters If the hookstrip type filters were not provided with a rigid backing, they would not be able to withstand the tension that is placed on them, and they would be pulled apart and destroyed when tension was applied to them.

The rigid frame type is also referred to as a pretensioned type filter because when the filter is manufactured, the filter medium is secured upon its rigid frame under tension. The rigid frame type filter is secured to the shaker with clamps in a matter similar to that previously described for tensioned filters or with wedges. However, in the case of rigid frame type filters, the clamps and wedges serve merely to secure the rigid frame type filters to the shaker and do not serve to further tension the filters since no further tensioning of pretensioned type filters is needed.

One of the problems encountered with these prior art filters is that they must, by their very nature, employ rigid backings or other similar types of apertured plates as an integral part of the filter. All prior art corrugated filters must be provided with a rigid backing in order for the corrugations to withstand the tension that is applied to them when they are secured to the shaker. Generally these rigid backings are constructed of metal and may be comprised of perforated metal sheets, or comprised of woven metal bands or slats. Adding these backings to the filters, as an integral part of the filters, significantly increases the cost of each of these filters. Additionally, whenever one of these types of filters must be disposed of, these integrated backings, which are not biodegradable or incinerable, increase the cost of disposal and increase the volume of material that must be disposed.

Another problem with these prior art filters is associated with how they are secured to the shaker. As previously described, each prior art filter is secured to the shaker by means of bolts and associated clamps. A series of multiple bolts and clamps or drawbars are necessary in order to secure each filter in place within a shaker.

In order to remove a filter so that the filter can be inspected, cleaned, or replaced, it is necessary to perform the following steps. First all of the bolts must be loosened. Then the drawbars must be knocked loose from each side of the shaker. The filter then can be removed and replaced with a new filter. The drawbars are then reinstalled, and all of the bolts are retighten. For a shaker that employs a series of three screens, the total shaker downtime required for filter maintenance can be as long as 45 minutes. Each time the shaker is out of operation, drilling must cease or a second shaker must be employed. Thus, downtime for a shaker translates into a significant financial burden due to the forced downtime of the drilling rig or additional expense of a second shaker.

A further problem with prior art filters of the hookstrip type is that they are curved upward in their center relative to their sides due to the tensioning of the screens over the support components. Pretensioned or rigid frame types of filters are generally not arched in this manner. The upward curvature of hookstrip type filters is caused by the arched support components that are provided under the filters. The arched support components are provided in order to support the filters when fluid is introduced onto the top surfaces of the filters and to prevent flexing of the filters when the filters are shaken in the shaker. As previously described, prior art filters of the hookstrip type are tensioned over these support structures when the filters are secured to the shaker, thus causing the top surface of the filters to be arched. Because the filters are arched from side to side, this arched or curved configuration disproportionately distributes the fluid flow over the surface of the screen, with the outer edge areas nearest the shaker sidewalls receiving the much greater portion of the flow. This overloading of the outer areas causes early clogging, or "blinding", a common problem requiring more frequent cleaning or screen replacement, as well as inefficient filtering when compared with a nonarched, i.e., flat, filters.

The present invention addresses these problems by providing a filter which does not employ integral metal support structures but instead relies upon the support proved from a non-tensioning receiving assembly that is provided on the shaker. A non-tensioning receiving assembly may be provided either as an integral art of new shakers or may be provided as a retrofit assembly for existing shakers. One type of non-tensioning assembly is taught in U.S. Pat. No. 5,690,826 and is provided with a hinged lid which can be easily opened and reclosed, allowing filters constructed in accordance with the present invention to be removed and replaced within the assembly in a matter of seconds. With such a short replacement time, the present filters can be replaced with only minimal downtime.

Filters constructed in accordance with the present invention are corrugated, which increases the surface area of the filters and thus increases their efficiency. Even though these filters do not have an integral backing, they can retain their corrugations during use because they are not placed under side-to-side tension, such as the tension that is exerted on prior art shaker filters.

Although the filters are corrugated and therefore are provided with undulations, the filters of the present invention remain flat while in use in the shaker, i.e. the filters are not arched in the middle relative to the sides of the filter. This allows them to function more efficiently than prior art, hook type filters that must be in an arched configuration when in use in shakers.

Due to the elimination of the integral metal support structure in the present filters, the cost of producing the present filters is greatly reduced over the cost of producing prior art shaker filters. Also, the cost of disposing of the present filters is also greatly reduced over the disposal costs for prior art shaker filters since the present filters consist almost entirely of nothing more than the fragile, lightweight wire mesh.

SUMMARY OF THE INVENTION

The present invention is a new type of shaker filter that is a corrugated, non-tensioned filter. The filter does not employ an integral rigid backing or other integral means of supporting the filter. Instead the filter secures to a shaker by non-tensioning fasting means provided on the shaker, such as for example the one taught in U.S. Pat. No. 5,690,826.

The filter is constructed of a several layers of wire cloth filtering material that is bonded together with a thermoplastic layer of material. The side edges of the filter are sealed with a non-thermoplastic edge cover to prevent injury to the user from the sharp edges of the wire cloth, or alternately, the side edges of the filter are sealed with additional thermoplastic material forming an edge cover to prevent injury to the user. The end edges of the filter are provided with additional thermoplastic material to serve as lips at the front, end edge and back end edge of the filter. The lip is a thicken border on the underside of the filter that serves to prevent injury to the user from the sharp edges of the wire cloth. The lips on the filter also serve to seal with the corrugated lips of the in a non-tensioning fastening means to seal the filter to the shaker and preventing liquid from leaking therebetween.

The steps in creating the filters consist of placing a thermoplastic material, such as a perforated sheet or spaced apart pellets between layers of different mesh size wire cloth, heating the layers of wire cloth until the thermoplastic material becomes fluid, cooling the layers of wire cloth until the thermoplastic material hardens and bonds the layers of wire cloth together. The layers of wire cloth are provided with side edges either during the heating process if the side edges are created of thermoplastic material, or alternately, after the thermoplastic material has cooled if the side edges are created of non-thermoplastic material. The layers of wire cloth are also provided with lips created from thermoplastic material on their front and back edges during the heating process. Finally, the bonded layers of wire cloth are corrugated to form the finished corrugated filter.

DETAILED DESCRIPTION OF THE PREFERRED EMBODIMENT INVENTION

Figure 2:
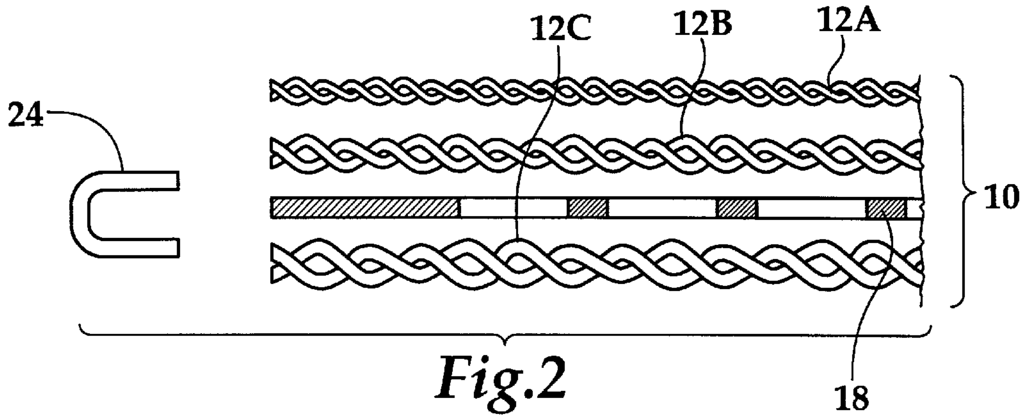
FIG. 2 is an exploded, cross sectional view of a side edge of a shaker filter that is being constructed in accordance with a preferred embodiment of the present invention.
Figure 3:
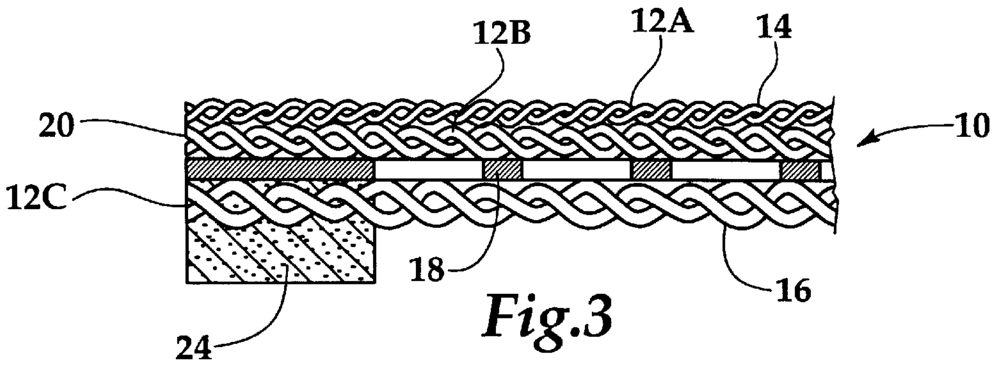
FIG. 3 is a cross sectional view of an end edge of the non-tensioned shaker filter of FIG. 2.
Figure 5:
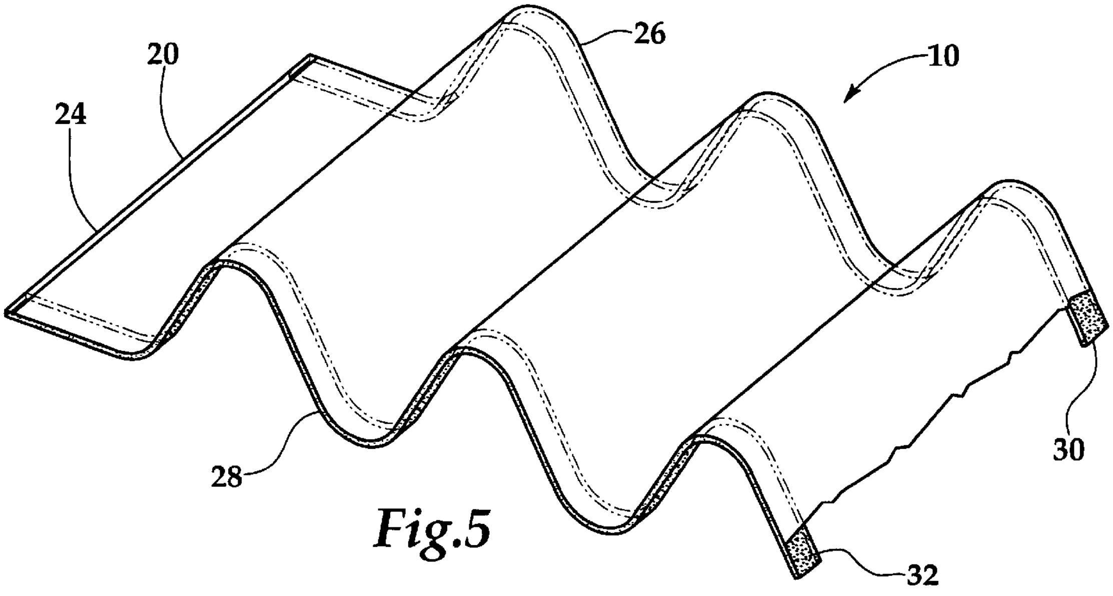
FIG. 5 is a partially cut away, perspective view of the non-tensioned shaker filter of FIGS. 2 and 3.

Referring now to the drawings and initially to FIGS. 2, 3 and 5, there is illustrated a non-tensioned shaker filter 10 constructed in accordance with a preferred embodiment of the present invention. The filter 10, as illustrated in FIG. 3, is preferably comprised of approximately three layers of wire cloth 12A, 12B, and 12C, bonded together so that consecutively larger weaves of wire cloth 12A, 12B, and 12C are encountered from top 14 to bottom 16 of the filter 10. The layers of wire cloth 12A, 12B, and 12C are preferably bonded together by employing a thermoplastic material 18, such as a perforated thermoplastic base sheet which, when heated and then cooled, bonds the layers of wire cloth 12A, 12B, and 12C together. It is important to sandwich the thermoplastic material 18 between the wire cloth 12A and 12B, or alternately, 12B and 12C in order to achieve good bonding of all layers.

Alternately, instead of employing a perforated thermoplastic base sheet, thermoplastic pellets can be employed. Spacing the pellets apart from each other achieves the same effect as using a perforated sheet. It is important that when using pellets that the pellets are sandwiched between the wire cloth 12A and 12B, or 12B and 12C or between the wire cloth 12A, 12B, and 12C so that the thermoplastic material 18 engages all layers of wire cloth 12A, 12B, and 12C in order to form a good bond therebetween when the thermoplastic material 18 is allowed to cool and harden. It is also important when employing pellets that the pellets be spaced a sufficient distance apart so that when they are melted in the process of making the filter, 10, the thermoplastic material 18 of adjacent pellets does not run together so as to completely obstruct passage of liquid through the wire cloth 12A, 12B, and 12C. The preferred thermoplastic material 18 for use as a perforated thermoplastic base sheet, or alternately, as thermoplastic pellets, is polypropylene, and it is generally desirable to heat the polypropylene to between approximately 300 and 500 degrees Fahrenheit in order to cause the polypropylene to reach a fluid condition so it will bond together the layers of wire cloth 12A, 12B, and 12C. However, other thermoplastic materials 18, such as nylon, or, alternately, a liquid adhesive (not illustrated), such as an epoxy, may be employed for this purpose.

In order to bond together the layers of wire cloth 12A, 12B, and 12C, the layers of wire cloth 12A, 12B, and 12C are heated, along with the thermoplastic material 18, i.e., either the sandwiched thermoplastic base sheet or the sandwiched thermoplastic pellets, between opposing surfaces of a heated press (not illustrated). Once the thermoplastic material 18 is heated sufficiently in order to cause it to become fluid, the wire cloth 12A, 12B, and 12C is removed from the press (not illustrated) and allowed to cool so the thermoplastic material 18 hardens and bonds the layers of wire cloth 12A, 12B, and 12C together.

Once the three layers of wire cloth 12A, 12B, and 12C have been bonded together, a left side edge (not illustrated) and a right side edge 20 are sealed by one of two means in order to prevent the user from being accidentally injured by the sharp right side edge 20 and the sharp left side edge (not illustrated) of the wire cloth 12A, 12B, and 12C. The first means for sealing the right side edge 20 and the left side edge (not illustrated), as illustrated in FIG. 2, is to employ a non-thermoplastic edge cover 24 over each side edge, i.e. the right side edge 20 and the left side edge (not illustrated). One of the non-thermoplastic edge covers 24 is secured around each of the side edges, i.e. the right side edge 20 and the left side edge (not illustrated), after the wire cloth 12A, 12B, and 12C has been bonded together. Alternately, the right side edge 20 and the left side edge (not illustrated) the filter 10 may be created by adding additional thermoplastic material 18 between the wire cloth 12A, 12B, and 12C along the right side edge 20 and the left side edge (not illustrated) prior to inserting the wire cloth 12A, 12B, and 12C and thermoplastic material 18 in the heated press.

Additional thermoplastic material 18 is also added between the wire cloth 12A, 12B, and 12C along front and back edges 26 and 28 of the wire cloth 12A, 12B, and 12C to form downwardly extending lips 30 and 32 on the front and back edges 26 and 28 of the wire cloth 12A, 12B, and 12C during the heating process.

Finally, the bonded layers of wire cloth 12A, 12B, and 12C, complete with finished right side edge 20 and finished left side edge (not illustrated) and complete with front and back lips 30 and 32, are corrugated to form the finished corrugated filter 10.

Figure 4:
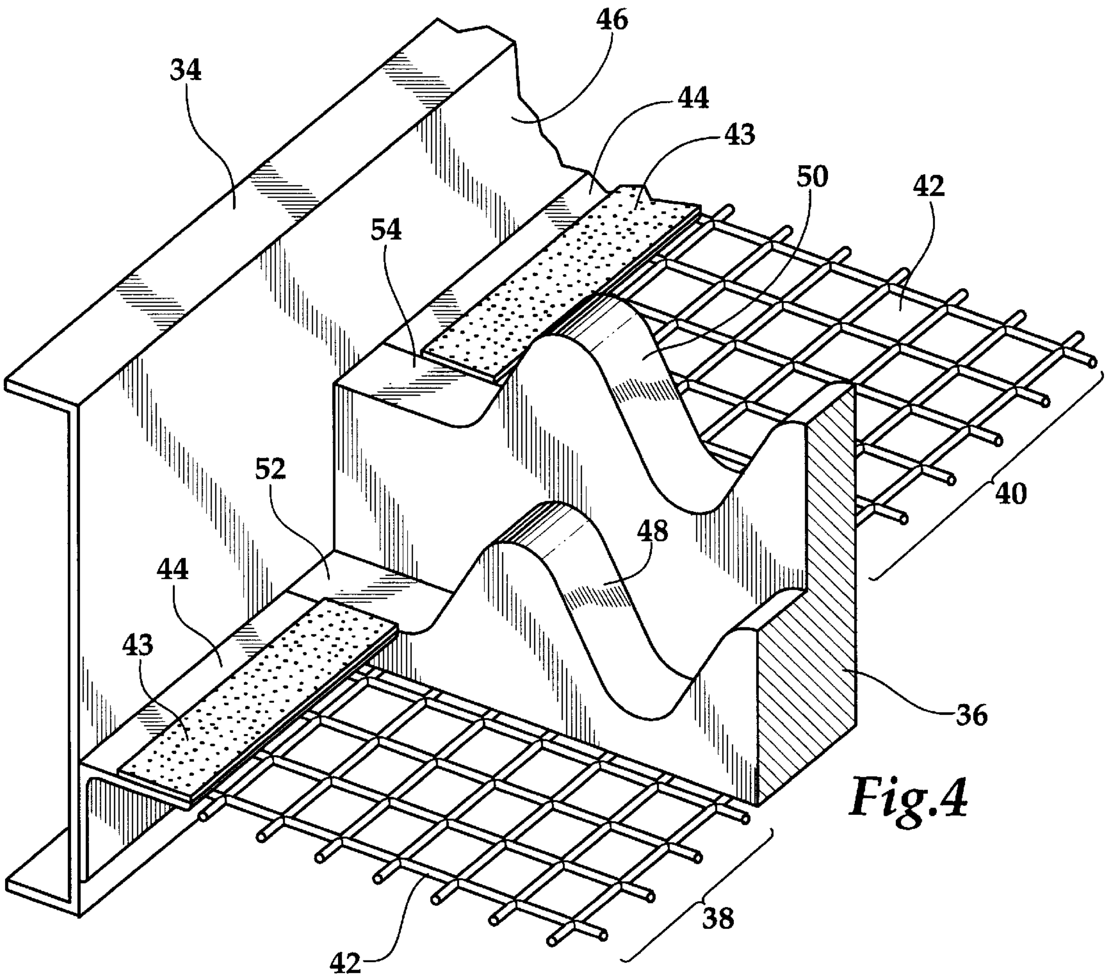
FIG. 4 is a perspective view of a non-tensioning fasting means provided on the shaker for receiving a non-tensioned shaker filter.

The filter 10 removably secures to the shaker 34 by a non-tensioning means 36, such as the non-tensioning means that is taught in U.S. Pat. No. 5,690,826. Referring to FIG. 4, two receiving compartments 38 and 40 of a non-tensioning means is illustrated. Each such receiving compartment 38 and 40 is designed to removably receive a filter 10. Each of the receiving compartments 38 and 40 of the non-tensioning means 36 is provided with a bottom 42 onto which the filter 10 is placed. The filter 10 inserts into the non-tensioning means 36 so that the right side edge 20 and the left side edge (not illustrated) lay on top of and bear against seal 43 provided on an upper side of an inwardly extending ledge 44 that is provided on each of the two side walls 46 of the shaker 34. The front and back lips 30 and 32 of the front and back edges 26 and 28 of the filter 10 lay on top of and seal against corrugated lips 48 and 50 that are provided, respectively, at front and rear ends 52 and 54 of the non-tensioning means 36. The filters 10 are secured in the receiving compartments 38 and 40 by lids (not illustrated) that are provided on each of the receiving compartments 38 and 40 and serve to hold each of the filters 10 between the lids (not illustrated) and their associated receiving compartments 38 and 40 so that the filters 10 are not tensioned.

Figure 1A:
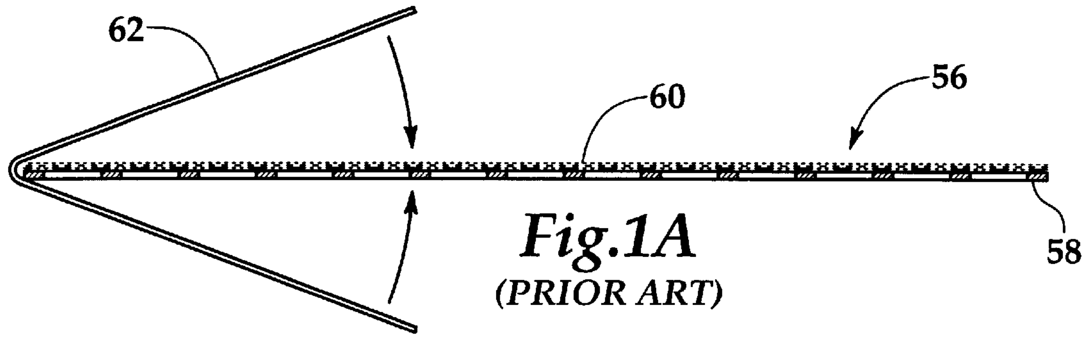
Fig.1A (PRIOR ART)
FIG. 1A is a side view of a prior art shaker filter that is under construction, showing a side edge being applied to a filter medium and rigid backing that were previously bonded together.
Figure 1B:
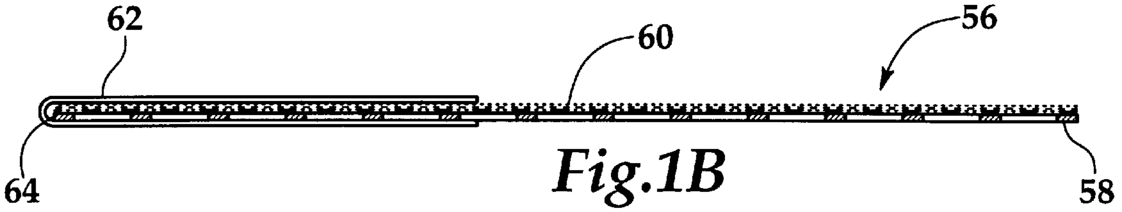
Fig.1B (PRIOR ART)
FIG. 1B is a side view of the prior art shaker filter of FIG. 1A, showing the side edge secured to the bonded filter medium and rigid backing.
Figure 1C:
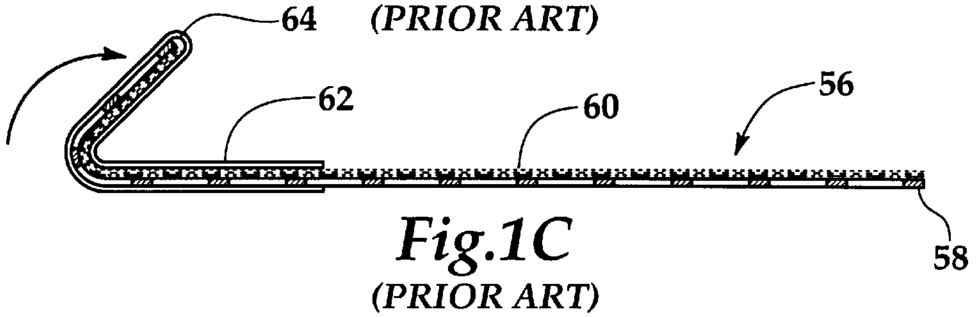
Fig.1C (PRIOR ART)
FIG. 1C is a side view of a completed prior art shaker filter that was constructed from the prior art shaker filter of FIG. 1B by forming a hook in the side edge of the filter.

To further illustrate how the filter 10 differs in construction and use from a prior art filter 56, FIGS. 1A, 1B and 1C illustrate the construction and final configuration of a hook-strip type shaker filter 56. As illustrated in FIG. 1A, the filter 56 is formed with a rigid, perforated backing 58 and filter medium 60 secured or bonded to the backing 58. The filter medium 60 is generally comprised of layers of wire cloth, similar to the layers of wire cloth 12A, 12B, and 12C employed in the filter 10. As shown in FIGS. 1A and 1B, a wide hook edge 62 is then secured to each of the two side edges 64 of the previously fused backing 58 and filter medium 60. As illustrated in FIG. 1C, the wide hook edge 62 is then bent into a hook configuration so that the resulting filter 56 can be secured under tension via its hook edges 62 to opposite side walls 46 of the shaker 34 by attaching tensioning clamps (not illustrated) to the hook edges 62. If desired, the prior art filter 56 may be corrugated, and the rigid backing 58 holds the corrugations intact as tension is applied to the rigid backing 58 by the hook edges 62. If the prior art filter 56 did not have a rigid backing 58, the corrugations would be pulled out of the filter 56 when tension was applied to the filter 56 during installation of the filter 56 in the shaker 34.

The present filter 10 can be distinguished from prior art filters 56 because the present filter 10 does not have a rigid backing 58, does not have hook edges 62, does not secure to the side walls 46 of the shaker 34 under tension, and does not require an integral rigid backing 58 to remain corrugated while in use in the shaker 34. Also, the present filter 10 is provided with front and back lips 30 and 32 and with right side edge 20 and left side edge (not illustrated) that form a liquid tight seal with the non-tensioning means 36 that is provided on the shaker 34, thus preventing leakage of fluids between the filters 10 and the shaker 34. Finally, by eliminating the need for incorporating a rigid backing 58 into the filter 10, the filter 10 is less expensive to make and to dispose, is lighter in weight, is easier to install and remove from the shaker 34, and is just as durable and effective as prior art filters 56.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A non-tensioned shaker filter and shaker comprising:

a shaker filter being free of any rigid backing and consisting of a plurality of layers of wire cloth bonded together and corrugated, a shaker which includes means for non-tensionly removably securing said shaker filter to said shaker via a non-tensioning means.

2. A non-tensioned shaker filter according to claim 1 further comprising:

a left side edge and a right side edge being provided on each plurality of layers of wire cloth to seal raw side edges of the plurality of wire cloth and to provide a means of sealing said left side edge and said right side edge to said non-tensioning means for securing a non-tensioned shaker filter to said shaker.

3. A non-tensioned shaker filter according to claim 1 further comprising:

a front lip extending downward on a front edge of said plurality of layers of wire cloth and a back lip extending downward on a back edge of said plurality of layers of wire cloth in order to seal raw edges of the plurality of wire cloth and to provide a means of sealing said front edge and said back edge respectively to a front corrugated lip and a back corrugated lip provided on said non-tensioning means for securing a non-tensioned shaker filter to a shaker.

* * * * *